Dec. 28, 1926.  
J. F. BOWERMAN  
1,612,093  
BATTERY TESTING DEVICE  
Filed July 22 1925
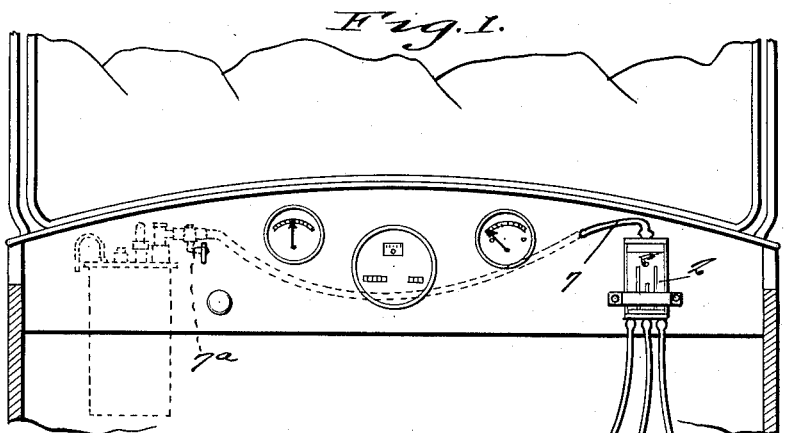
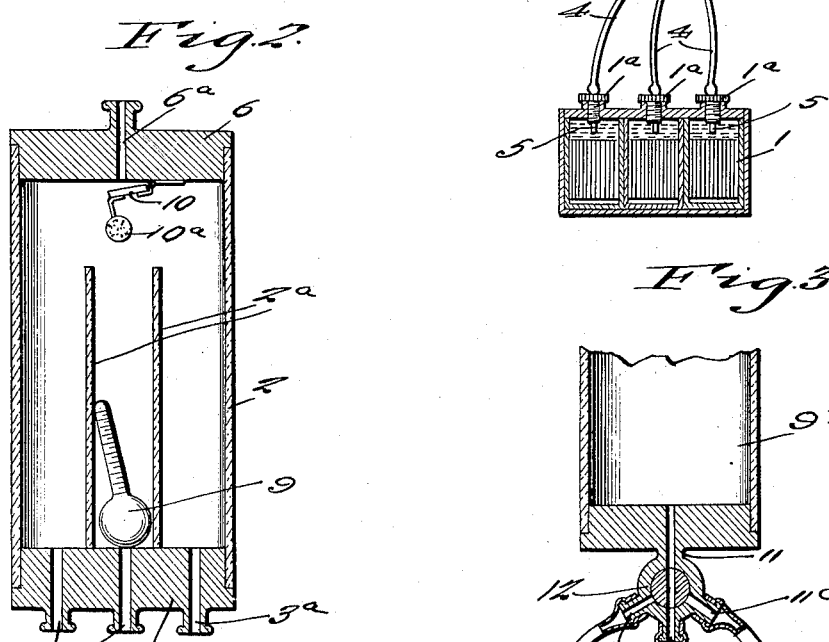
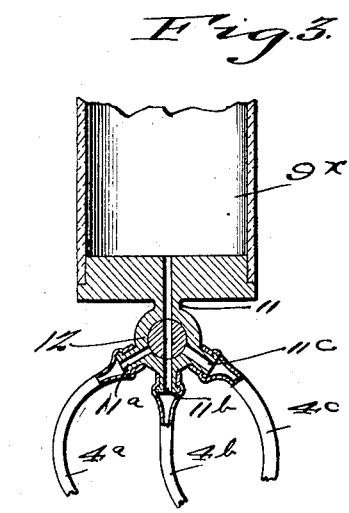
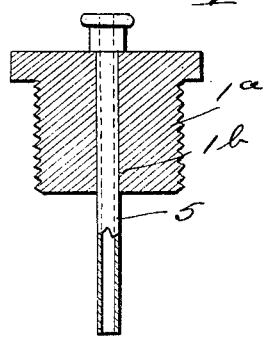
Inventor  
James F. Bowerman  
By Shan Middleton Donaldson & Hull  
Attorney

Patented Dec. 28, 1926.

1,612,093

UNITED STATES PATENT OFFICE.

JAMES FRASER BOWERMAN, OF JACKSON, MICHIGAN.

BATTERY-TESTING DEVICE.

Application filed July 22, 1925. Serial No. 45,397.

My present invention relates to improvements in devices or apparatus for testing the condition of the electrolyte for storage batteries, and is more particularly designed for ascertaining the amount of water and degree of charge of the storage batteries of automobiles where the batteries are placed in such position that it is necessary to lift the seats, remove floor boards, or otherwise do a considerable amount of work in order to get access to the battery.

The present invention aims to provide means by which the exact condition of the cell of each battery as to amount of water and degree of charge may be readily ascertained, and which will enable fresh water to be readily supplied where this is found necessary.

With these and other objects in view, the invention includes the novel features of construction and arrangement of parts hereinafter described, and particularly defined by the appended claims.

An embodiment of my invention is illustrated in the accompanying drawings, in which:—

Figure 1 is a view largely of a conventional nature, showing a portion of an automobile with my invention applied thereto.
Fig. 2 is an enlarged view showing the parts in section.

Fig. 3 is a detail view showing a modification.

Fig. 4 is an enlarged sectional detail of one of the cell plugs of Fig. 1.

Referring by reference characters to this drawing, the numeral 1 designates the battery, which is shown as of the ordinary three-cell type having the usual closure plugs 1ª for each cell. 2 indicates a glass-walled testing chamber having partitions 2ª forming three compartments, and which is preferably formed open at its top and bottom ends, the bottom end being provided with a closure member 3 which may conveniently be in the form of a plug, as shown, adapted to make a fluid tight fit with the lower end of the testing chamber. The plug is provided with three apertures 3ª to which are connected three pipes 4, which lead to the respective battery cells. These pipes 4 are preferably in the shape of rubber tubes having relatively thick walls capable of preventing collapsing under suction, and having small portions for the passage of the electrolyte. The preferred means of connecting them to the battery cells is to provide each closure plug 1ª with an axial port or passage 1ᵇ through which is passed a nipple 5 with a fluid tight fit, the upper end of the nipple being connected to the lower end of the respective tube preferably by making the nipple with an enlarged cylindrical part at its upper end onto which the end of the rubber tube may be forced with a fluid tight friction fit so as to be removable from the plug when necessary, although of course the tube might be permanently connected to the nipple and the nipple removed from the battery plug.

The upper open end of the testing chamber or vessel is closed by a removable closure member 6, which is likewise preferably formed in the shape of a plug of material which will make a fluid tight contact with the upper edge of the testing vessel, which closure plug 6 is provided with an exhaust port 6ª, which is connected by a pipe 7 to an engine part in which suction is produced by the engine when running, which is here shown for convenience as the upper end of the vacuum tank, the connection 7 being provided with means such as a stop cock 7ª by which the suction can be cut off when desired.

With the parts connected up as shown, if the stop cock 7ª is opened, suction exerted through the pipe 7 will exhaust the air from the top of the testing chamber or vessel 2 and if the electrolyte is of the proper level in the battery, the liquid will be drawn up into the indicating vessel and its presence therein will show that no water is needed in the battery. If, however, the water in any particular cell is below the lower end of the nipple thereof, which in practice is adjusted so that its lower end is slightly above the plates, then air will pass up through the pipe to relieve the suction and no liquid will show in the testing vessel. By closing the connection through two of the pipes 4, as by pinching said pipes, the entire suction will be thrown through the remaining pipe and thus, by a selective closure of said pipes, each cell may be tested.

For testing the degree of the charge, I may provide a hydrometer 9 which may be placed in any one of the compartments, or if desired, three hydrometers could be placed in the testing vessel, one in each compartment and left permanently in place therein.

For testing the specific gravity of the cells the operator would turn on cock 7ª to cause the suction to act on the vessel 2 until the electrolyte had risen therein to the proper height, whereupon, on cutting off the suction, the electrolyte would be retained in the vessel long enough to permit hydrometer reading. Valve 7ª may be constructed with a port communicating with the atmosphere, so that on completion of the testing or hydrometer reading, the vacuum may be broken to permit the electrolyte to return to the cell, or the same result can be accomplished by merely pulling the plug 6 out of the upper end of the vessel. In order to prevent the electrolyte from being drawn up into the vacuum tank or intake manifold, or other suction producing part by carelessness of the operator, I provide a float operated valve 10 controlled by a float 10ª, which is so arranged that when the electrolyte has risen in the testing vessel to the height of the float, the port 6ª will be closed and the suction cut off and electrolyte prevented from being drawn into the pipe 7.

It will be understood that in practice it is not necessary to test the specific gravity as often as it is to determine the height of the electrolyte in the battery cells.

Instead of using three separate compartments, as shown in Figs. 1 and 2, I may provide a single testing chamber 9ˣ having a nipple 11 connected with the bottom plug thereof provided with a three-way valve 12, the nipple having three branch connections 11ª, 11ᵇ, 11ᶜ, which are connected by pipes 4ª, 4ᵇ and 4ᶜ with the respective battery cells, as indicated in Fig. 3.

Having thus described my invention, what I claim is:—

1. In apparatus for testing the electrolyte of storage batteries, an open topped transparent testing chamber having a tubular connection to the battery cell, a removable fluid tight closure member for the upper end of said chamber, means connected to said closure member for exhausting air from the testing chamber, and a float actuated valve for cutting off the exhaust when the electrolyte has reached a predetermined height in said chamber.

2. In apparatus for testing the electrolyte of storage batteries, an open topped transparent testing chamber, a closure member therefor, said chamber having a suitable connection with the battery cell, means connected to said chamber for exhausting air therefrom, a hydrometer in said chamber, and means for cutting off the exhaust before the hydrometer touches the top of the testing chamber.

3. In apparatus for testing the electrolyte of storage batteries, a normally closed testing chamber having a transparent wall and an exhaust passage in the top thereof, means connecting said exhaust passage to a source of suction, means placing the lower part of said chamber in communication with a battery cell, a hydrometer in said chamber, and a flap valve pivoted to the under side of said top and arranged to close said exhaust passage, and a float depending from the free edge of said flap.

4. The apparatus of claim 1, in which the cell has partitions terminating below the top of the chamber, forming individual compartments corresponding to the individual battery cells, and means are provided for placing the compartments in communication with the respective cells.

5. The apparatus of claim 1, in which the testing chamber is mounted on the dash of the automobile and connected by rubber tubes to the battery cells by nipples removably inserted in the cell closure plugs.

6. The apparatus of claim 1, in which the closure member of the testing chamber is connected by a flexible pipe to an engine part, subjected to the suction pull of the engine, and means is provided for cutting off the suction connection.

In testimony whereof I affix my signature.

JAMES FRASER BOWERMAN.